April 21, 1925.  1,535,020

P. P. FRAZER

MOLDING MACHINE

Filed March 24, 1921   7 Sheets-Sheet 6

Inventor:
Pinkney P. Frazer.
By
Attorney.

April 21, 1925.  P. P. FRAZER  1,535,020
MOLDING MACHINE
Filed March 24, 1921   7 Sheets-Sheet 7

Inventor:
Pinkney P. Frazer.
By Fred'k Shannon
Attorney.

Patented Apr. 21, 1925.

1,535,020

UNITED STATES PATENT OFFICE.

PINKNEY P. FRAZER, OF ST. LOUIS, MISSOURI, ASSIGNOR, BY MESNE ASSIGNMENTS, TO EDWARD SCHAEFER AND DETLEF F. SCHAEFER, TRUSTEES FOR THE MULTIPLE MOLDING MACHINE CO., OF ST. LOUIS, MISSOURI, A COMMON-LAW TRUST.

MOLDING MACHINE.

Application filed March 24, 1921. Serial No. 455,000.

*To all whom it may concern:*

Be it known that I, PINKNEY P. FRAZER, a citizen of the United States, residing in the city of St. Louis, and State of Missouri, have invented certain new and useful Improvements in Molding Machines, of which the following is a specification.

My invention relates generally to molding machines, and, has particular reference to an improved machine for packing or ramming sand in the cope and drag of a molder's flask, alternately.

The object of my present invention is to provide a molding machine, which is a distinct and practical improvement to overcome certain practical objections to, and defects in, the present types of molding machines, and which shall be adapted to ram the sand in the cope and drag of a moulder's flask more rapidly, more perfectly, more economically and with much less manual labor than has been possible hitherto.

A further, special and particular object of the invention is the provision of a cope and drag supporting table capable of reciprocating movement upon a track below a plunger so that the sand can be compressed in the cope half of a flask while the drag half of the flask is being filled with sand, and vice-versa.

A further object of the invention is to provide a molding machine which will be simple in construction, durable, strong, easily manipulated and highly efficient for the purpose intended.

With the above and other objects in view, the invention consists in the novel features of construction, arrangement and combination of parts hereinafter more fully described and finally pointed out in the claims hereto appended.

Referring to the accompanying drawings forming a part of this specification wherein like characters of reference denote similar parts throughout the several views.

Figure 1:
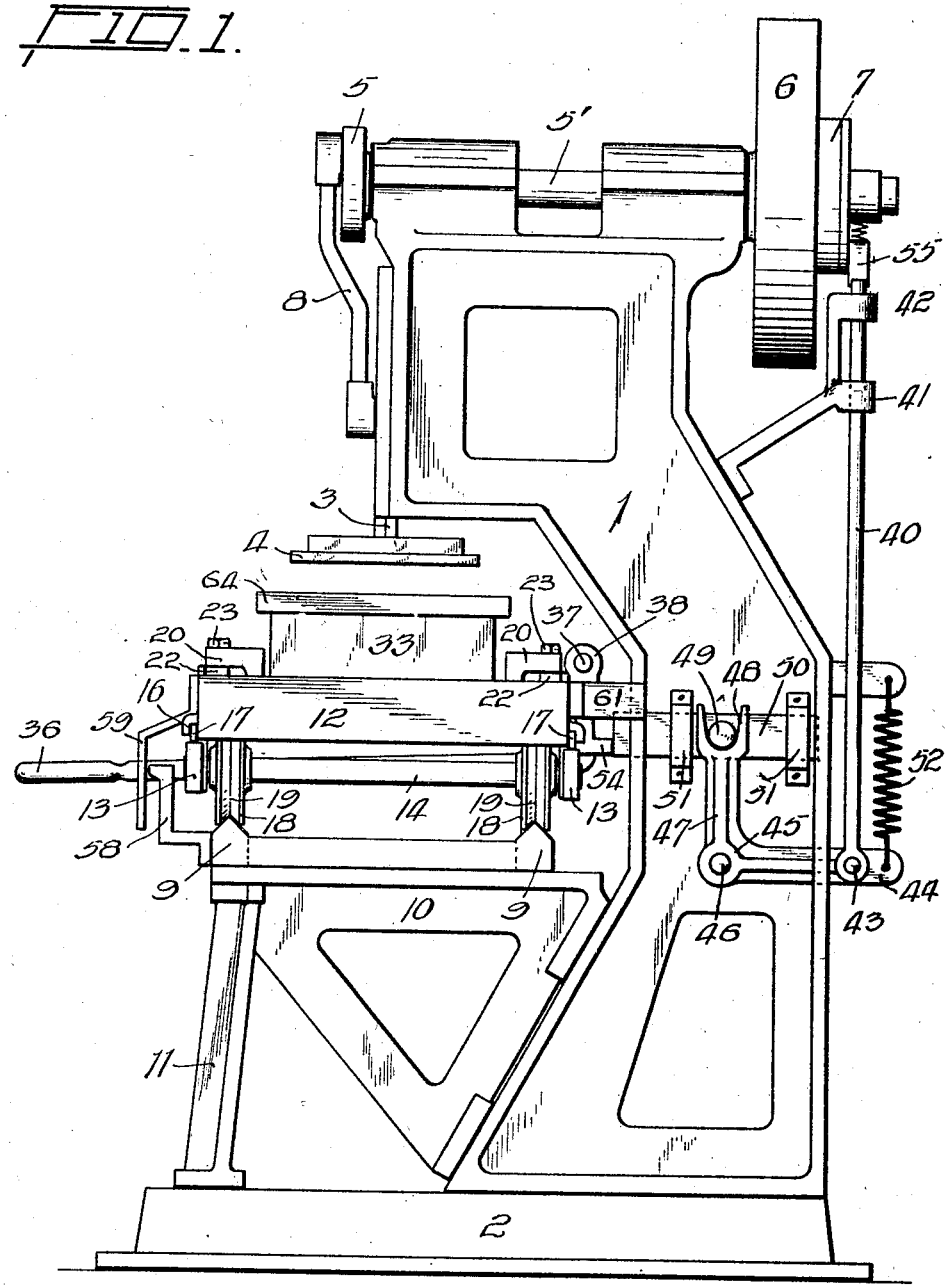
Fig. 1, is a side elevation of a molding machine constructed in accordance with my invention.
Figure 2:
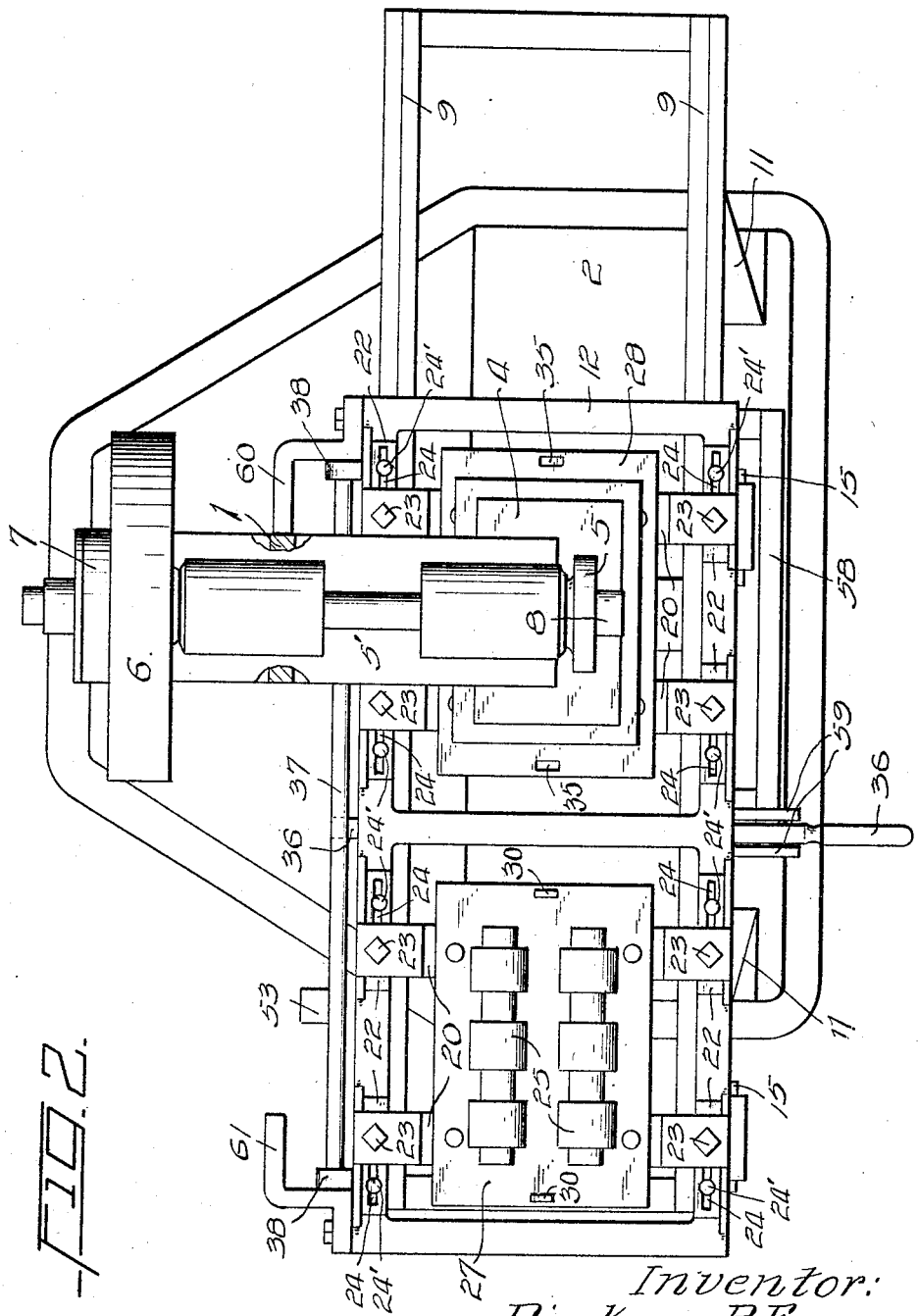
Fig. 2, is a top plan view thereof.

In carrying out the aim of my present invention, I employ, as shown in Fig. 1, a suitable supporting column 1, preferably mounted on a suitable base 2.

A suitable plunger 3 is slidably mounted upon the front face of the column 1 and is provided at its lower end with a removable pressure plate 4. The plunger is of the vertical reciprocating type and may be actuated by any well known power. For illustrative purpose only, I have shown the plunger as actuated by an eccentric mechanism consisting of an eccentric wheel 5 fixed to a suitably driven shaft 5′. The shaft 5′ is provided with a suitable fly wheel 6 and a suitable clutch 7. The eccentric wheel 6 is connected with the plunger 3 by means of a suitable connecting rod 8. The fly wheel 6 is shown as being driven by means of a belt, although it may be driven in any other well known manner.

Figure 3:
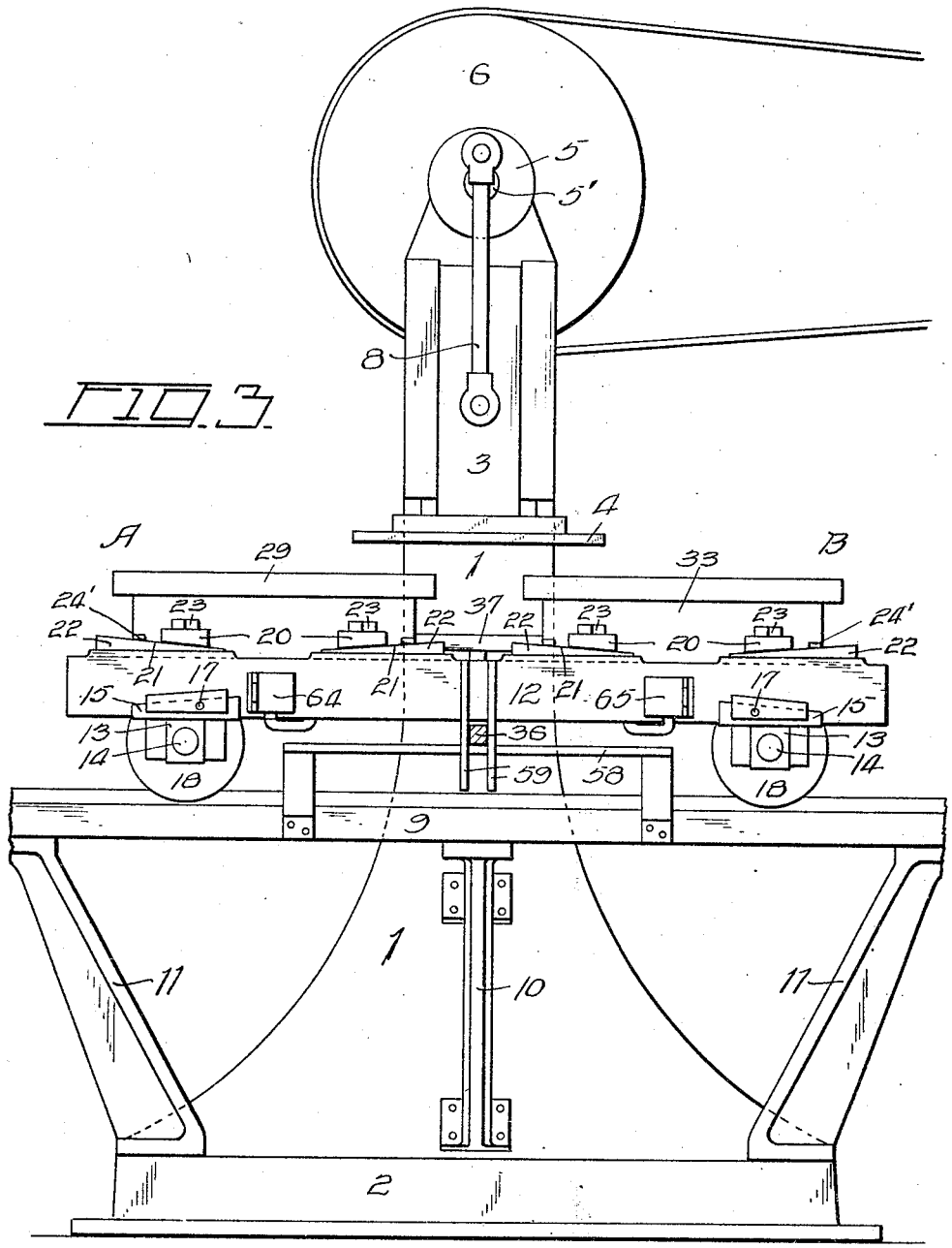
Fig. 3, is a front elevation of the machine with parts of the track broken away, and showing the flask carriage positioned midway the ends of the supporting track.
Figure 6:
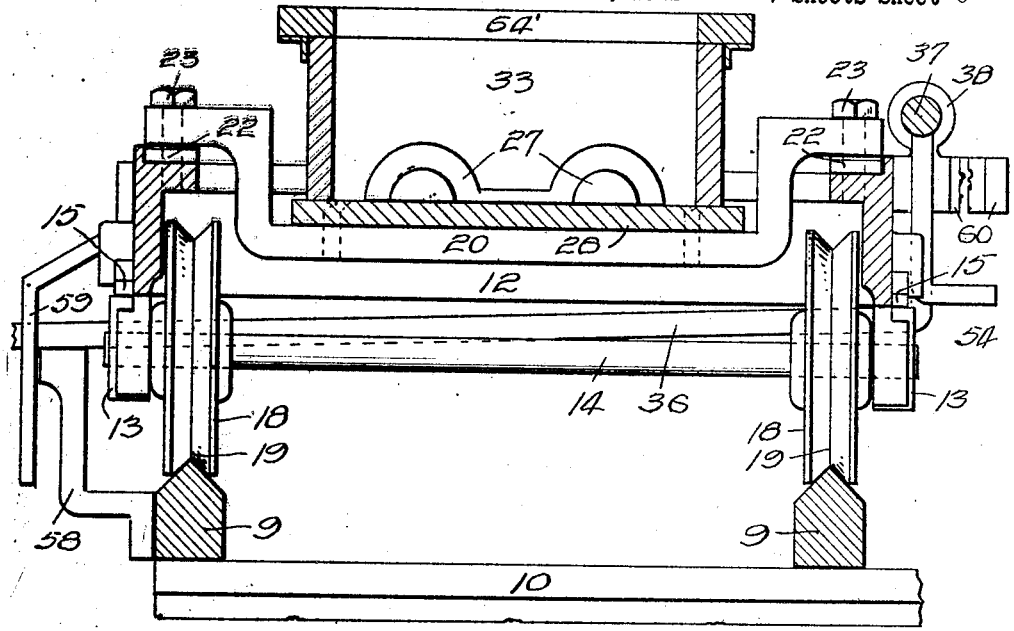
Fig. 6, is an elevation of the carriage mounted upon the supporting track.

A track, as clearly shown in Figs. 3 and 6, and consisting of a pair of suitable rails 9, is supported by means of suitable supporting brace members 10 and 11, which brace members are preferably fixed to the column 1 and base 2, respectively.

Figures 7, 8:
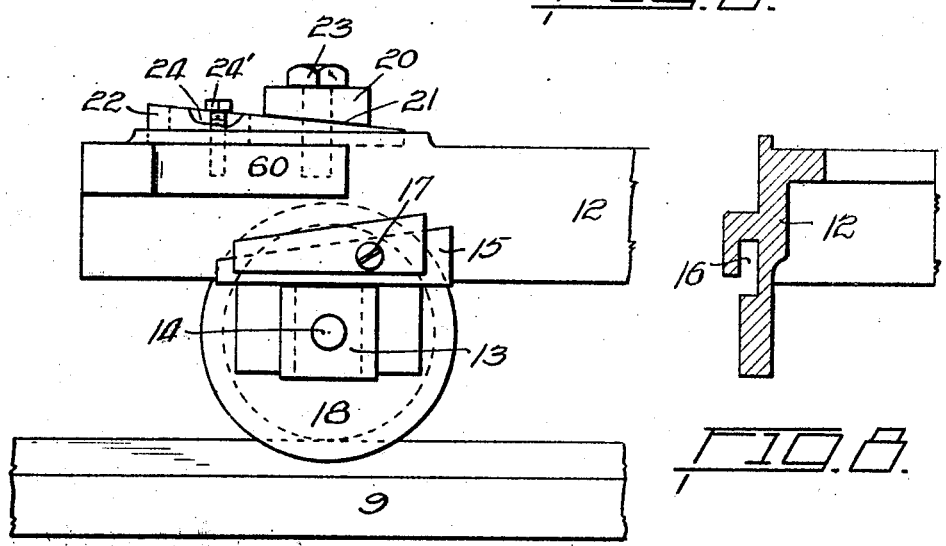
Fig. 7, is a detail, in side elevation, of one end of the carriage.
Fig. 8, is a detail, in sectional elevation, of one of the side members of the carriage.

12 indicates a suitable carriage frame, or table, which is provided with the bearings 13, in which are journaled the axles 14 near each end of the carriage frame. The bearings 13 are movable, or adjustable vertically by means of suitable wedge blocks 15. These wedge blocks 15 rest upon the bearings 13 and are mounted in the tapered ways 16 of the carriage frame 12. Each wedge block 15 is preferably held in its adjusted position by means of a suitable set screw 17, as shown in Fig. 7. Each axle 14 is provided with a pair of supporting wheels 18, as shown in Fig. 6. The wheels 18 each have their peripheral face suitably grooved, as at 19, to receive and ride upon the rails 9 of the carriage supporting track, as clearly shown in Fig. 6.

As shown in Figs. 5, 6 and 7, 20 indicates a plurality of pattern plate supporting cross-members which are preferably vertically adjustable. The cross-members 20 are supported at each end by the side members of the carriage frame 12. Each end of each cross-member 20 is preferably provided with a lower inclined face 21, as shown in Fig. 7, to engage and rest upon a wedge member 22. A suitable fastening device, such as a screw member 23, passes through each end of each cross-member 20, through the wedge blocks 22 and into the carriage frame 12 to securely lock the cross-pieces 20 in their properly adjusted positions. Each wedge member 22 is provided with a slotted opening 24 for the passage of a screw 24′ to permit horizontal movement of each wedge member 22 for either raising or lowering the cross pieces 22, as is manifest.

The carriage 12 is divided, for illustrative purpose, into two divisions and will be known as the cope end, and the drag end, and, for the purpose of clearness, the left half of the carriage 12, designated A, will be hereinafter known as the cope end of the carriage and the right half of the carriage designated B, will be hereinafter known as the drag end. It will here be observed that the cope end A of the carriage 12 is provided with a pair of pattern supporting cross-pieces 20 and that the drag end is also provided with a pair of pattern supporting cross-pieces 20, which cross-pieces 20 will be known hereinafter as pattern supports.

Figure 5:
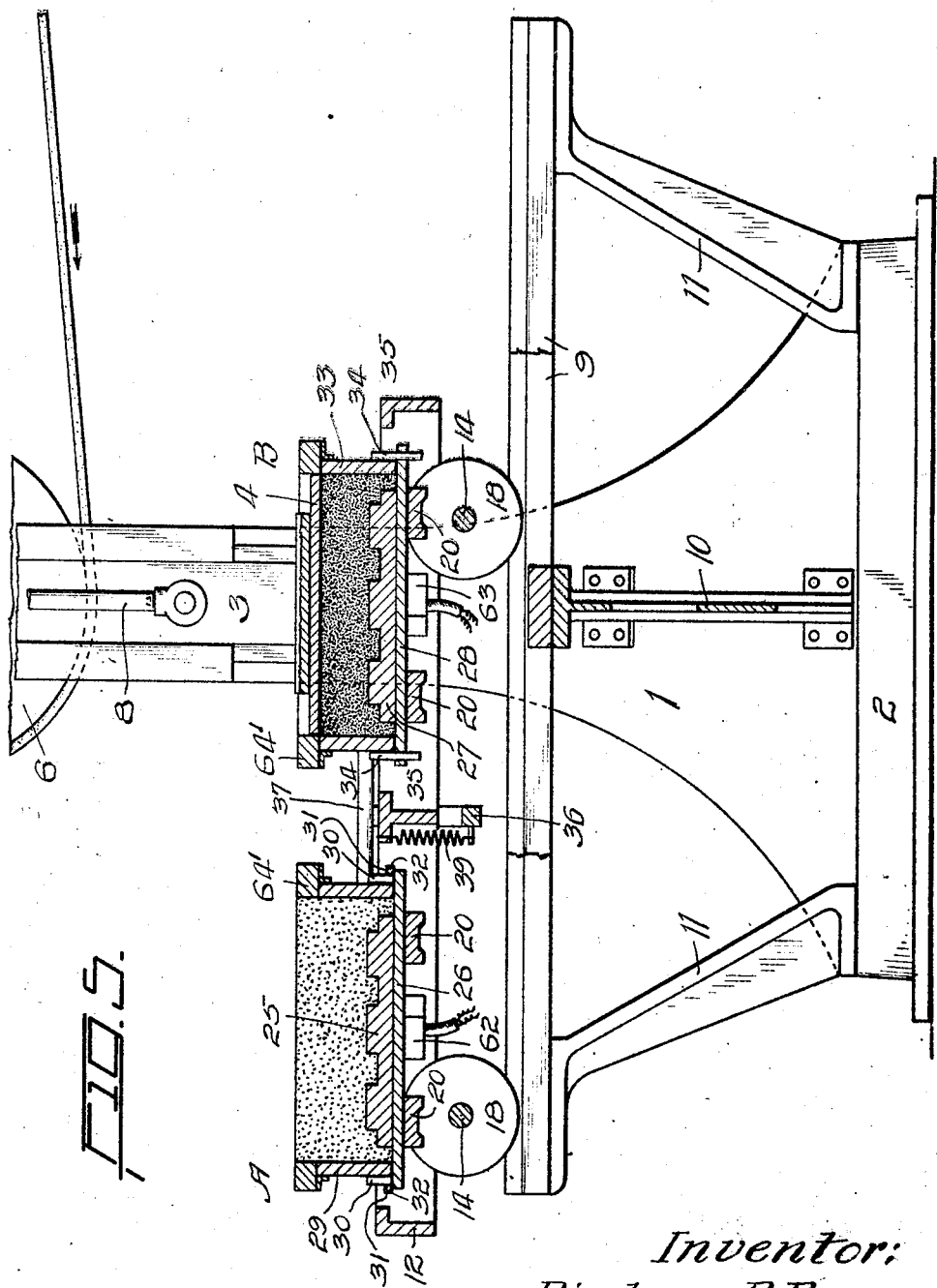
Fig. 5, is a view of the molding machine partly in front elevation and partly in sectional elevation and showing the sand being rammed in the drag half of a flask by the plunger.

As shown in Figs. 5 and 6, 25 indicates a pattern fixed to a pattern supporting plate 26, which is removably fixed to the pattern supports at the cope end A of the carriage 12. 27 represents a pattern fixed to a supporting plate 28, which is removably fixed to the pattern supports 22 at the drag end B of the carriage 12.

As shown in Figs. 3, 4 and 5, 29 represents the cope half of a moulder's flask and it is removably mounted upon and supported by the cope pattern plate 26, as clearly shown in Fig. 5. The cope half 29 of the moulder's flask is held in position upon the pattern plate 26 while being filled with sand and rammed or squeezed, by means of the pins 30. These pins 30 are fixed to the pattern plate 26 and are receivable in the openings 31 of the ears 32. These ears 32 are fixed to each end of the flask half, as shown.

33 represents the drag half of a moulder's flask and it is removably mounted upon and supported by the drag pattern plate 28, as clearly shown in Fig. 6.

The drag half 33 of the moulder's flask is held in position upon the pattern plate 28 while being filled with sand and rammed or squeezed by means of pins 34. These pins 34 are fixed to the end walls of the flask half and enter openings 35 at each end of the pattern plate 28.

It will here be understood and readily seen, that the table or carriage 12 being wheel supported, is capable of reciprocating movement for bringing the cope under the plunger 3 and then the drag and vice-versa, so that the sand can be rammed, pressed or squeezed therein, in alternate relation.

Figure 9:
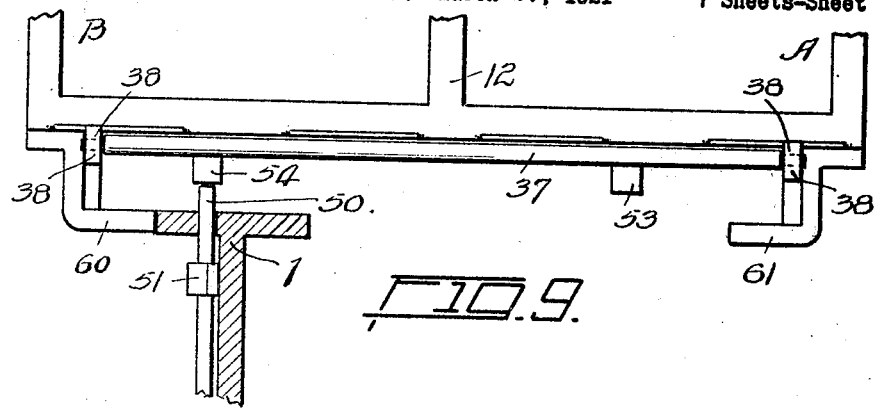
Fig. 9, is a detail, in plan view showing the stop of the carriage which engages the machine column for limiting the movement of the carriage in either direction.
Figure 10:
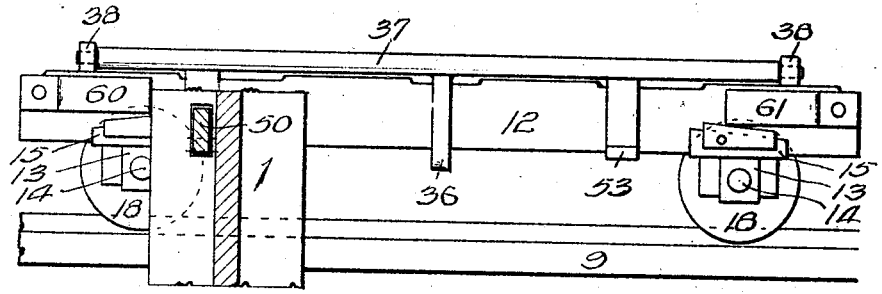
Fig. 10, is a rear elevation of the carriage showing the carriage stops and the trip shaft.
Figure 11:
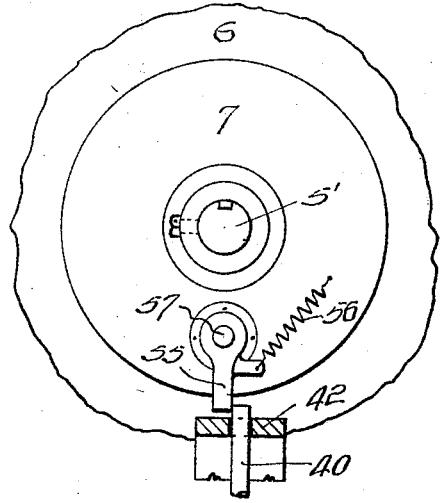
Fig. 11, is a detail showing the clutch trip mechanism.

The means herein provided for moving the pattern supporting carriage from one position to the other upon the supporting track, and vice-versa, consists of a lever 36 fixed at one end to a rocker trip shaft 37, which shaft is journaled at its ends in suitable bearings 38, as shown in Fig. 9. The lever 36 is held in its upper or normal position by means of a suitable spring element 39, as shown in Fig. 5. The spring 39 is suitably fixed at one end to the lever 36 and at its opposite end to the carriage 12, as shown in Fig. 5.

As illustrated in Fig. 1, the means illustrated for actuating the clutch 7 and imparting vertical reciprocating movement to the plunger 3, consists of stop rod 40 guided by the bearings 41 and 42. The lower end of the stop rod 40 is pivotally connected, as at 43, to the free end of arm 44 of a bell crank 45, which bell crank 45 is fulcrumed, as at 46. The arm 47 of the bell crank 44 is provided with a bifurcated end 48 to receive the lateral extending pin 49 of a slidable member 50 mounted in suitable bearings 51. The bell crank 44, the slidable member 50 and the stop rod 40 are held in their normal positions by means of the coiled spring 52, as clearly shown in Fig. 1.

The rocker shaft 37 is provided with two spaced depending kicker arms 53 and 54, as shown in Fig. 7. These arms register with the forward end of the slidable member 50 when the carriage is moved to its extreme position at either end of the track, as determined by stops hereinafter described. As illustrated in Fig. 5, the carriage has been moved to a position so that the drag end B is positioned directly under the plunger 3. When the carriage is in this position, the kicker arm 54 will register with the forward end of the bell crank actuating member 50 as shown in Fig. 9. Now, when the lever 36 is depressed to the position shown in Fig. 1, it will be understood that the kicker arm 54 will engage the end of member 50 and that further depression of the lever 36 will move the member 50 rearwardly, and thereby move the bell-crank 45, which in turn would pull the stop rod 40 downwardly, releasing the upper end of the rod from engagement with the locking dog 55 fixed to the shaft 5'. When the rod 40 has been moved from engagement with the dog 55, the coiled spring 56 will move the dog 55 which is fixed to the pin 57 thereby causing the clutch to engage the fly wheel and cause the shaft 5' to make one revolution and then stop owing to the fact that the spring 52 will immediately raise the stop rod 40 after the lever 36 has been depressed and released, thus causing the locking dog 55 to strike the stop rod 40 and disengage the clutch to prevent further rotation of the shaft 5'.

Figure 4:
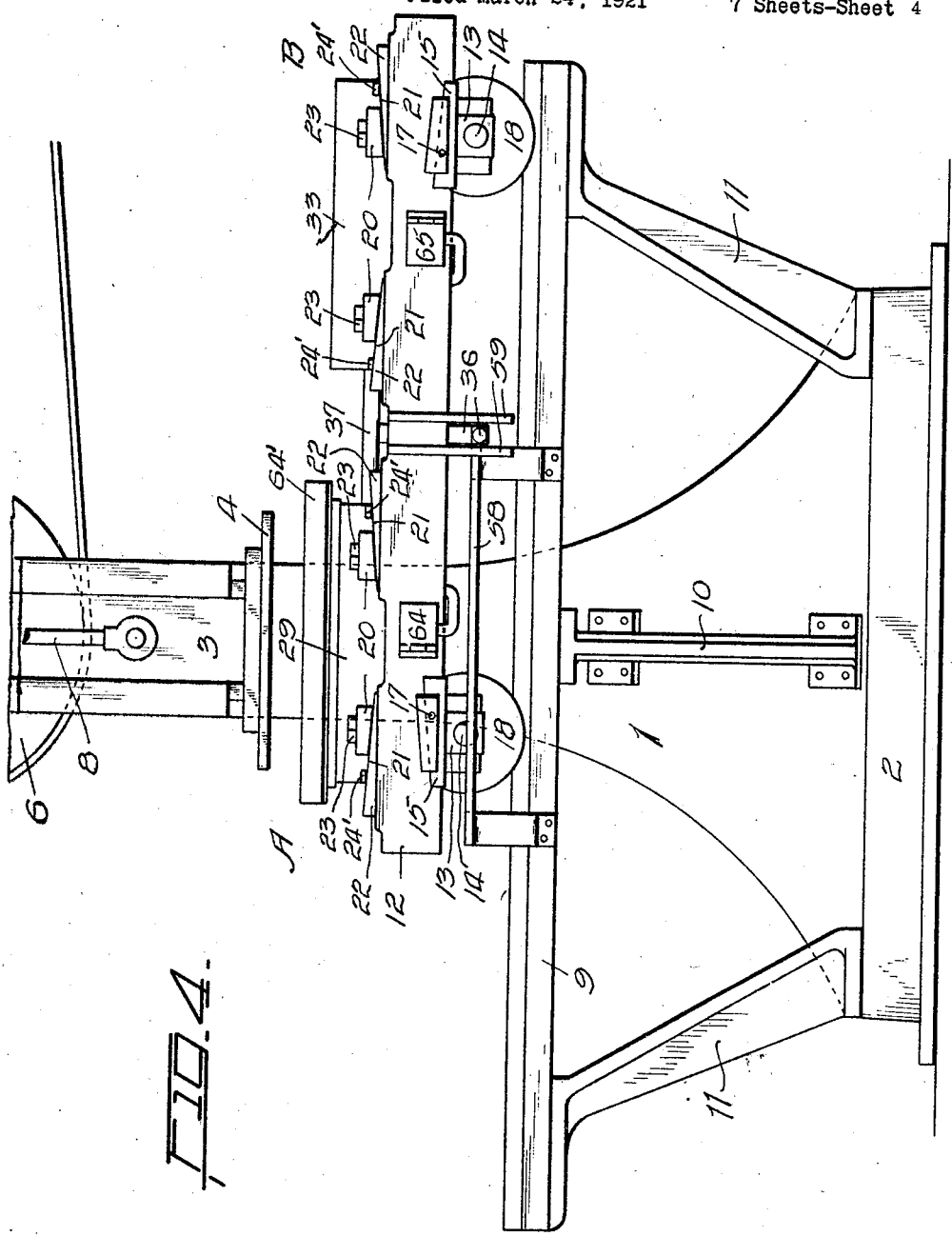
Fig. 4, is a front elevation of the machine, showing the cope end of the carriage directly under the plunger.

To guard against accidental depression or downward movement of the carriage actuating lever 36 by the operator and thereby causing the clutch to be engaged and impart movement to the plunger 3 before either the cope or drag is directly below the plunger plate 3, I provide a guide rail 58 which is suitably fixed to the front rail 9 of the carriage supporting track as clearly shown in Figs. 4 and 6. While moving the carriage from one position to another, it will be readily seen from Figs. 3 and 4, that the hand lever 36 rides upon the guide rail 58 until the carriage 12 has reached its predetermined position in either direction. After the carriage 12 has reached its determined position at either end of the track, it is evident that the hand lever 36 may be depressed for releasing the clutch 7 and cause the plunger 3 to make one downward and upward movement compressing the sand in either the cope or drag in its travel downward. The hand lever 36 is guided from any possible lateral movement at its handle end by means of the guide member 59 fixed to and depending from the carriage 12, as clearly shown in Fig. 4.

A suitable stop 60 is fixed to the carriage 12 near one end thereof and a suitable stop 61 is fixed to the carriage near the opposite end thereof, as clearly shown in Fig. 9. The purpose of the stops are to limit the movement of the carriage 12, in either direction, so as to cause the cope and drag halves of the moulder's flask to stop directly under the plunger 3 for compressing the sand therein. In Fig. 9, I have shown the stop 60 as in engagement with one side of the column 1. Owing to the employment of the stops 60 and 61, and the lever guide rail 38, it will be observed, that it is impossible to disengage the clutch 7 and cause the plunger 3 to complete a cycle until either stop 60 or stop 61 engages the column 1, thus it is necessary to positively bring either the drag or cope directly beneath the plunger 3 prior to movement of the plunger, which obviates all danger of the plunger being actuated before either the drag or cope has been brought to its proper position below the plunger 3 and thus further avoiding any possible damage to either the drag or cope through accidental movement of the plunger 3, as the plunger can not be actuated until either the drag or cope is directly beneath and in alignment with the plunger 3.

62 and 63 indicate suitable vibrators fixed to the bottom face of the pattern plates 26 and 28, respectively. These vibrators are illustrated as being capable of being actuated electrically by the operators by pressing on the hinged plates 64 and 65. These vibrators have a tendency to loosen the sand from contact with the patterns and pattern supporting plates as is manifest.

The machine is especially designed to be actuated by two operators and the operation of the molding machine is as follows:

Assuming that the molding operations are just beginning, the carriage is moved to bring the drag end B thereof under the plunger and then number one operator places the cope half of the molder's flask upon the pattern plate 26, places a riser 64' upon the flask half and fills the flask half with sand, as illustrated in Fig. 5. Now, number one operator moves the carriage to bring the cope under the plunger and then presses lever 36 causing the plunger to be actuated for compressing the sand. During the compressing operation of the sand, number two operator places the drag half of the flask upon the pattern plate 28, places a riser 64' upon the flask half and fills the same with sand. After this operation, number two man moves the carriage to bring the drag under the plunger, actuates lever 36 and then follows up the cope removing same from the carriage, then number one operator places a new cope flask half upon pattern plate 26 fills same with sand, moves cope to position under plunger, actuates cope to position under plunger, then follows up the drag and removes same. These operations are kept up in this manner by two operators, thus providing a molding machine, which, due to the reciprocating carriage mechanism, keeps the operators working continuously, first at one end of the machine and then at the other.

It is evident, from the foregoing description, that I provide a molding machine, which will permit copes and drags to be moved beneath a plunger for compressing the sand, in alternate relation, with a minimum number of operators, thereby increasing production as there is no time lost by the operators due to the reciprocating and ramming features of the carriage and plunger supporting the cope and drag.

It is, of course, understood that the operations of mounting copes and drags may be commenced at either end of the machine, and, further that if desired, one machine may be used only for copes and another for drags.

The many advantages of the herein described invention will readily suggest themselves to those skilled in the art to which it appertains.

I do not wish to be understood as having limited myself to the specific details of construction shown and described, but desire to have it understood that the invention I have shown in the drawings, is merely illustrative, as it is manifest that various minor changes may be made in the exact construction and particular arrangement of several parts without departing from the spirit of my invention, hence I reserve the right to make any such changes, or modifications as may fairly fall within the scope of the appended claims when fairly construed.

What I claim is:

1. In combination with a molding machine having a track base and a plunger disposed above the base, of a wheel supported carriage adapted to support both a cope and a drag at the same time, said carriage being mounted for limited reciprocal movement upon said track base and the distance of said movement being the distance between the centers of the cope and the drag.

2. In combination with a molding machine having a track base and a plunger disposed above the base, of a wheel supported carriage mounted for limited reciprocal movement upon said track base, a cope supported upon one side of the center of said carriage and a drag supported upon the opposite side of the center of said carriage so that compression of the sand in the cope by means of the plunger can be accomplished simultaneously with the removal of a tamped drag, the replacing of another drag in lieu thereof and the filling of the same with sand and vice-versa.

3. A molding machine having a movable carriage to support a cope at one end and a drag at the other end of the carriage, and power driven mechanism for compressing sand in the cope simultaneously with the filling of the drag with sand and vice-versa.

4. In a molding machine, an upright standard having an overhanging head, an elevated bench track fixed to said standard, a carriage reciprocably mounted upon said track, a cope removably mounted upon one end of said carriage, a drag removably mounted upon the opposite end of said carriage, means for regulating the elevation of the cope and drag with relation to the track and other means upon said standard for compressing sand within the cope while the drag is being filled with sand and vice-versa.

5. In a molding machine, an upright standard, a track, means for supporting said track in an elevated position, a vertically disposed reciprocating plunger mounted above said track, a wheel supported carriage mounted upon said track, vertically adjustable means at one end of said carriage for supporting a metal pattern, vertically adjustable means at the other end of said carriage for supporting a metal pattern, means for supporting a cope and drag at either end of said carriage so that while sand is being compressed in the cope the drag can be filled with sand to be brought under the plunger to be compressed while the cope is being removed and an empty cope mounted upon its place upon the carriage and vice-versa.

6. The combination with elevated rails constituting a track and a press, of a wheel supported carriage mounted to ride upon said track, vertically adjustable cross-pieces removably fixed to said carriage, a pair of pattern plates fixed to said cross-pieces, a cope supported by one of said pattern plates, a drag supported by the other pattern plate and means limiting the movement of said carriage to bring the cope directly under the press during movement in one direction and means for limiting the movement of said carriage to bring the drag directly under the press during movement of the carriage in the opposite direction.

7. A cope and drag supporting means for molding machines comprising a wheel supported carriage frame, cross-pieces spanning the frame for supporting a pattern plate at either end of said frame and means for adjusting said frame to the desired elevation with relation to the axis of the wheels of the carriage.

8. In a molding machine, a base, a standard fixed to said base, a track, means for supporting said track in an elevated position above said base, a plunger supported by said standard, a wheel supported carriage mounted on said track for limited reciprocating movement thereon and vertically adjustable pattern supporting cross-pieces carried at either end of said carriage so that a cope and a drag may be supported by the carriage at one and the same time.

9. In a molding machine, an elevated track, a plunger positioned above said track, a wheel supported carriage, means at one end of said carriage for supporting a cope while sand therein is being compressed by said plunger, means at the opposite end of the carriage for supporting a drag to be moved under the plunger simultaneously with the movement of the carriage in moving the cope from under the plunger and means for limiting the movement of said carriage upon said track in either direction to bring either the cope or drag into cooperative relation therewith while sand is being compressed either within the cope or drag.

10. In a molding machine, a standard, a track, a carriage movably mounted upon the track adapted to support a cope and a drag side by side, a clutch controlled plunger, a manually controlled lever for moving the carriage to alternately bring the cope and the drag directly beneath the plunger for compressing sand therein, means for imparting and controlling the reciprocating movement of said plunger, and stops fixed to one side of said carriage at opposite ends thereof adapted to engage the standard for limiting the movement of the carriage in either direction below the plunger.

11. The combination with a standard having a vertically reciprocable press plate, of an elevated track, a carriage mounted for movement on said track, means for supporting a cope at one end of said carriage, means for supporting a drag at the opposite end of said carriage and said cope and drag supporting means being vertically adjustable with relation to the carriage.

12. The combination with a standard having a vertically reciprocable press plate, of an elevated track, a carriage mounted for movement on said track, means for supporting a cope at one end of said carriage, means for supporting a drag at the opposite end of said carriage said cope and drag supporting means being vertically adjustable with relation to the carriage and stops carried by the carriage for engagement with the standard to limit the movement of the carriage in either direction to stop the cope and drag in cooperative relation with the plunger.

13. In combination with a molding machine comprising a standard and a power operated plunger, of a track supported by said standard in an elevated position, a single wheel supported carriage supporting both a cope and a drag mounted side by side for limited reciprocal movement upon said track, and means carried by the carriage for supporting patterns, the cope and the drag.

14. In combination with a molding machine comprising a standard and a power operated plunger, of a track supported by said standard in an elevated position, a wheel supported carriage mounted to ride upon said track, U-shaped cross-pieces spanning said frame for supporting patterns and the cope and drag, said cross-pieces being vertically adjustable with relation to the carriage frame.

15. In a molding machine, a base, a standard, a shaft journaled in upper end of said standard, a drive pulley mounted upon said shaft, a clutch mechanism co-acting with said pulley, a plunger, a connection between said plunger and said shaft, a track supported above said base and in advance of said standard, a wheel supported carriage mounted upon said track, means for supporting a pattern and a cope at one end of said carriage, means for supporting a pattern and a drag at the opposite end of said carriage, stops fixed to said carriage for engagement with the standard for limiting the movement of said carriage to stop cope or drag directly beneath the plunger and manually actuated mechanism for tripping the clutch when either the cope or drag are in cooperative relation with the plunger and not otherwise.

16. The herein described method of making foundry sand molds which consists in compressing sand alternately in a cope and in a drag both mounted upon opposite ends of the same carriage which is reciprocably mounted upon a track.

17. The herein described method of making foundry sand molds which consists in removably mounting a cope upon one end of an elevated reciprocable wheel supported carriage, filling either the cope or drag with sand, moving the carriage to a position to bring either the cope or the drag beneath a plunger for compressing the sand therein by a single stroke of a plunger, removably mounting a drag upon the opposite end of the same carriage simultaneously with the compression of sand within the cope, filling the drag with sand, manually moving the carriage in an opposite direction to bring the drag beneath the plunger for compressing the sand within the drag, removing the cope from the carriage simultaneously with the compression of the sand within the drag and replacing another cope thereon filling it with sand and moving it to a point below the plunger simultaneously with the movement of the drag from under the plunger and vice-versa.

In testimony whereof, I have hereunto signed my name to the specification.

PINKNEY P. FRAZER.